US010838360B2

(12) United States Patent
Georgiou et al.

(10) Patent No.: US 10,838,360 B2
(45) Date of Patent: Nov. 17, 2020

(54) VARIABLE SHEAR WITH VOLUME HOLOGRAMS

(71) Applicant: Microsoft Technology Licensing, LLC, Redmond, WA (US)

(72) Inventors: Andreas Georgiou, Cambridge (GB); Adrian Robert Leigh Travis, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 15/723,028

(22) Filed: Oct. 2, 2017

(65) Prior Publication Data
US 2019/0101866 A1 Apr. 4, 2019

(51) Int. Cl.
*G02B 5/32* (2006.01)
*G03H 1/02* (2006.01)
(Continued)

(52) U.S. Cl.
CPC ....... *G03H 1/0248* (2013.01); *G02B 27/0172* (2013.01); *G03H 1/0256* (2013.01);
(Continued)

(58) Field of Classification Search
CPC ...... G03H 1/0248; G03H 1/0256; G03H 1/18; G03H 1/2645; G03H 2001/0439;
(Continued)

(56) References Cited

U.S. PATENT DOCUMENTS 6,211,976 B1   4/2001 Popovich et al.
6,699,407 B1 * 3/2004 Sutehrland ........... C09K 19/544
                                              252/299.01
(Continued)

FOREIGN PATENT DOCUMENTS

JP   0385418 A2    1/1986
JP   S616681 A  *  1/1986  ............... G03H 1/02
(Continued)

OTHER PUBLICATIONS

Lyayshuk et al (Double Exposure Variable Shear Holographic Interferometry with Controlled Sensitivity, Optics and Spectroscopy, Feb. 14, 2006, vol. 101, No. 6, pp. 962-966) (Year: 2006).*
(Continued)

*Primary Examiner* — Stephone B Allen
*Assistant Examiner* — Jyotsna V Dabbi
(74) *Attorney, Agent, or Firm* — Alleman Hall Creasman & Tuttle LLP

(57) ABSTRACT

An optical device including a first rigid substrate, a flexible holographic optical element, a transparent flexible material having a variable shear transmission property across an in-plane direction of the flexible holographic optical element, and a second rigid substrate, where the flexible holographic optical element and the transparent flexible material are located between the first and second rigid substrates, where the variable shear transmission property of the transparent flexible material transmits variable amounts of a shear force applied to the first or second rigid substrates across the in-plane direction of the flexible holographic optical element.

20 Claims, 9 Drawing Sheets

(51) Int. Cl.
 G02B 27/01 (2006.01)
 G03H 1/18 (2006.01)
 G03H 1/26 (2006.01)
 G03H 1/04 (2006.01)

(52) U.S. Cl.
 CPC ............. *G03H 1/18* (2013.01); *G03H 1/2645* (2013.01); *G02B 2027/0174* (2013.01); *G03H 1/265* (2013.01); *G03H 2001/0216* (2013.01); *G03H 2001/0439* (2013.01); *G03H 2001/266* (2013.01); *G03H 2223/16* (2013.01); *G03H 2240/54* (2013.01); *G03H 2270/31* (2013.01); *G03H 2270/32* (2013.01)

(58) Field of Classification Search
 CPC ..... G03H 2001/266; G03H 2001/0216; G03H 2223/16; G03H 2240/54; G03H 2270/31; G03H 2270/32; G02B 27/0172; G02B 2027/0174
 USPC .......................................................... 359/15
 See application file for complete search history.

(56) References Cited

U.S. PATENT DOCUMENTS

| | | | |
|---|---|---|---|
| 6,867,888 | B2 | 3/2005 | Sutherland et al. |
| 7,173,744 | B1 | 2/2007 | Whiteside et al. |
| 7,932,000 | B2 | 4/2011 | Hayashida et al. |
| 8,552,299 | B2 | 10/2013 | Stoykovich et al. |
| 2014/0126029 | A1 | 5/2014 | Fuetterer |
| 2016/0195720 | A1* | 7/2016 | Travis ................ G03H 1/2205 345/8 |

FOREIGN PATENT DOCUMENTS

| | | |
|---|---|---|
| JP | S616681 A | 1/1986 |
| WO | 2016113534 A1 | 7/2016 |

OTHER PUBLICATIONS

Shukla et al (Design and Fabrication of a variable frequency grating and its application as a lateral shear interferometer having a variable shear, Optics & Laser Technology, 39 pp. 338-346,2007) (Year: 2007).*

Abramson (Sandwich hologram interferometry. 3:Contouring, Applied Optics, vol. 15, No. 1, Jan. 1976, pp. 200-205) (Year: 1976).*

"International Search Report and Written Opinion Issued in PCT Application No. PCT/US2018/052510", dated Jan. 7, 2019, 14 Pages.

Wong, et al., "Analog Tunable Gratings Driven by Thin-Film Piezoelectric Microelectromechanical Actuators", In Applied Optics, Optical Society of America, vol. 42, No. 4, Feb. 1, 2003, 6 Pages.

* cited by examiner

VARIABLE SHEAR WITH VOLUME HOLOGRAMS

BACKGROUND

Holographic optical elements can be sheared to bring an incident beam into or out of Bragg condition, and deflect the incident beam in a predefined angle.

SUMMARY

An optical device is provided, including a first rigid substrate, a flexible holographic optical element, a transparent flexible material having a variable shear transmission property across an in-plane direction of the flexible holographic optical element, and a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
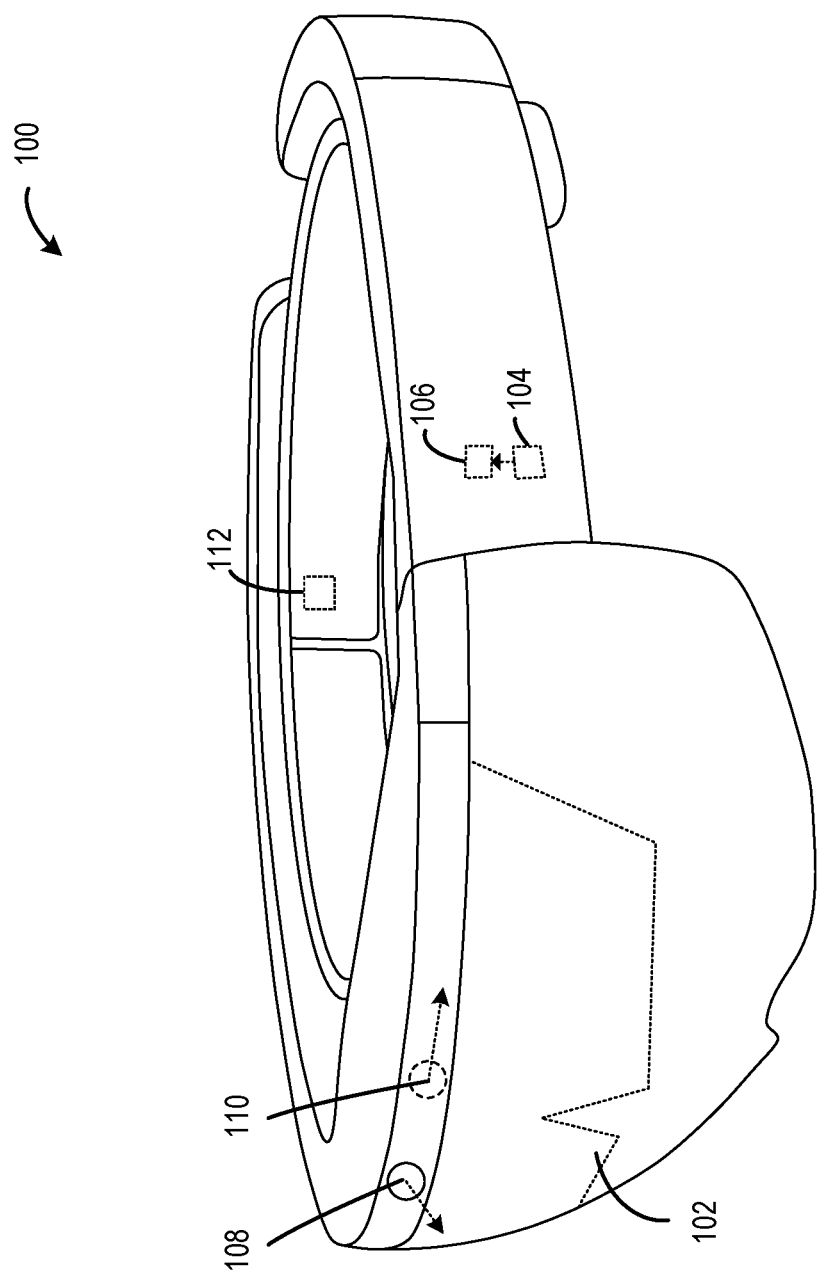
FIG. 1 shows a side perspective view of a computing device in the form of a head mounted display (HMD) device, according to one embodiment of the present disclosure.

A head-mounted display (HMD) device may include a near-eye display (NED) to provide immersive imagery to wearers. An HMD device may combine virtual imagery generated by an NED with a view of the surrounding physical environment in a "mixed" or "augmented" reality configuration, or may replace at least a portion of a wearer's field of view with NED output in a "virtual reality" configuration. The NED may assume various configurations that enable its output of virtual imagery. For example, the NED may employ holographic optics to generate images.

Providing a large eyebox in which imagery is viewable, and achieving a wide field of view, are common design goals in a holographic NED. When configured with a holographic optical element (HOE), the NED may be designed to receive light that satisfies an angular selectivity condition—e.g., light incident within a specific range of angles that satisfies a Bragg condition of the HOE. Light incident in a subset of the range of angles is diffracted by the HOE toward a corresponding focal point in a coherent, focused manner. Light received outside of the subset but within the specific range of input angles, however, may exhibit aberration relative to the focal point when diffracted. An unfocused, dimmed, and/or otherwise lower quality image may result, in turn limiting the eyebox in which desired imagery is produced. While additional exit pupils may be provided with additional holographic optics such as a fanout grating, different aberration conditions may be associated with each exit pupil, which may become more severe as the effective eyebox is expanded. Further, light diffracted by the HOE may be limited to a single eye relief distance. Note that an HOE may be designed and fabricated to operate over a narrow or wide range of angles—i.e., with narrow or wide angular selectivity. Depending on the angular selectivity, the HOE may be replaced with another thick or thin hologram. These include diffractive optical elements (DOEs), kinoforms, volume Bragg gratings, surface Bragg gratings, switchable Bragg gratings, and/or other static or dynamic technologies that can act as a thin or thick volume hologram. "HOE" and/or "flexible HOE" as used herein may refer to a range of diffractive components including but not limited to the aforementioned optical components.

Shearing a flexible Bragg grating HOE may deform the fringes of the HOE, and thus change the Bragg angle. Thus, mechanically shearing the flexible HOE can bring an incident beam into or out of Bragg condition and deflect the incident beam at a predefined angle of the encoded hologram. HOEs configured to diffract a collimated beam into another collimated beam at a different angle may only require a uniform amount of mechanical shear to be applied across the HOE to minimize potential aberrations. However, HOEs illuminated with a non-collimated beam, and/or diffracting the light of an incident collimated beam into a non-collimated beam may have non-uniform grating vectors, and thus the amount of shear required for each position on the HOE may be different. For example, when the fringes of the HOE are nearly parallel to a substrate that the shear is applied to, the amount of shear required to go out of Bragg condition is large (goes to infinity as the fringes become parallel). On the other hand, when the fringes are perpendicular to the substrate, the amount of shear required to go out of Bragg condition is small. Thus, applying a uniform shear to an HOE with a non-uniform grating vector may cause the diffracted beam to become highly aberrated.

Accordingly, to address the issues discussed above, an example optical device configured to variably shear the surface of a flexible HOE to minimize aberrations is disclosed herein. One example optical device includes a first rigid substrate, a flexible holographic optical element, a transparent flexible material having a variable shear transmission property across an in-plane direction of the flexible holographic optical element, and a second rigid substrate, wherein the flexible holographic optical element and the transparent flexible material are located between the first and second rigid substrates. In this example optical device, the variable shear transmission property of the transparent flexible material transmits variable amounts of a shear force applied to the first or second rigid substrates across the in-plane direction of the flexible holographic optical element. The variable shear transmission property of the transparent flexible material may be manufactured according to the non-uniform grating vector of the flexible HOE to minimize potential aberrations caused in diffracted light.

FIG. 1 shows an example HMD device 100 in the form of a pair of wearable glasses including an NED 102. The NED 102 may be configured as an augmented reality display which may augment the environment surrounding the user of the HMD device 100 with virtual imagery presented by the NED 102. In another example, the NED 102 may be configured as a virtual reality display with which substantially the entirety of the surrounding physical environment is occluded, and allows at least a portion of a user's field of view to be replaced with virtual imagery presented by the NED 102.

As shown, HMD device 100 includes a processor 104 for controlling the NED 102 and other processes of the HMD device 100. Among other potential operations, the processor 104 may drive the NED 102 to control the display of virtual imagery. The HMD device 100 may further include other computer components 106, such as, for example, a volatile storage device, a non-volatile storage device, a power supply, etc. In some example, the processor 104 may communicate with one or more devices remote from the HMD device 100.

The processor 104 may interface with one or more sensors provided within or remotely from HMD device 100. The sensor(s) may include, but are not limited to, a microphone array, one or more outward facing image sensors 108, one or more inward facing image sensors 110 (e.g., an eye/gaze tracking system), and an inertial measurement unit (IMU) 112. As one example, the processor 104 may use output from the IMU 112 to adjust output from NED 102 that reflects movement of the wearer in a manner that the wearer feels present in the virtual environment or augmented environment displayed on the NED. As another example, the processor 104 may cause display of a view of the surrounding physical environment on NED 102 captured via outward facing image sensors 108 in a stereo arrangement, which may enable the determination of depth. In this example, NED 102 may present a pass-through mixed reality environment in which virtual imagery is superimposed over the captured view of the physical environment.

The example display systems described herein also may be implemented in devices other than HMD device 100. Examples of such devices may include other HMD devices, other wearable devices, mobile non-wearable devices, and stationary devices.

Figure 2A:
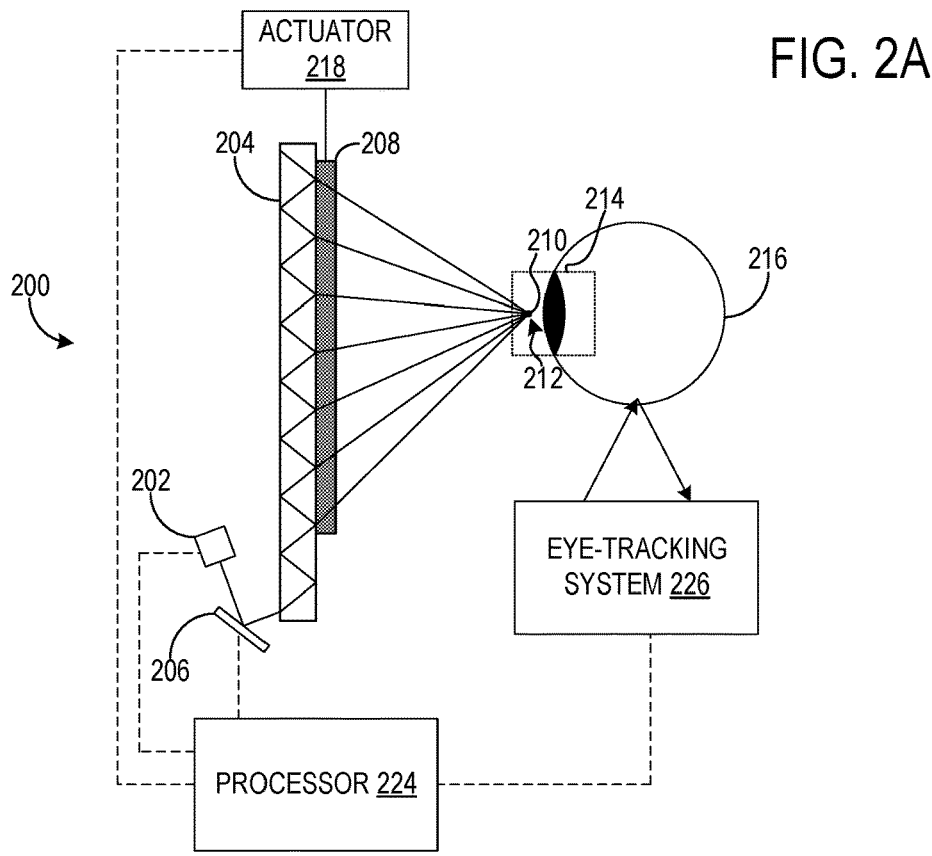
FIG. 2A shows an example display system that may be implemented in the HMD device of FIG. 1.
Figure 2B:
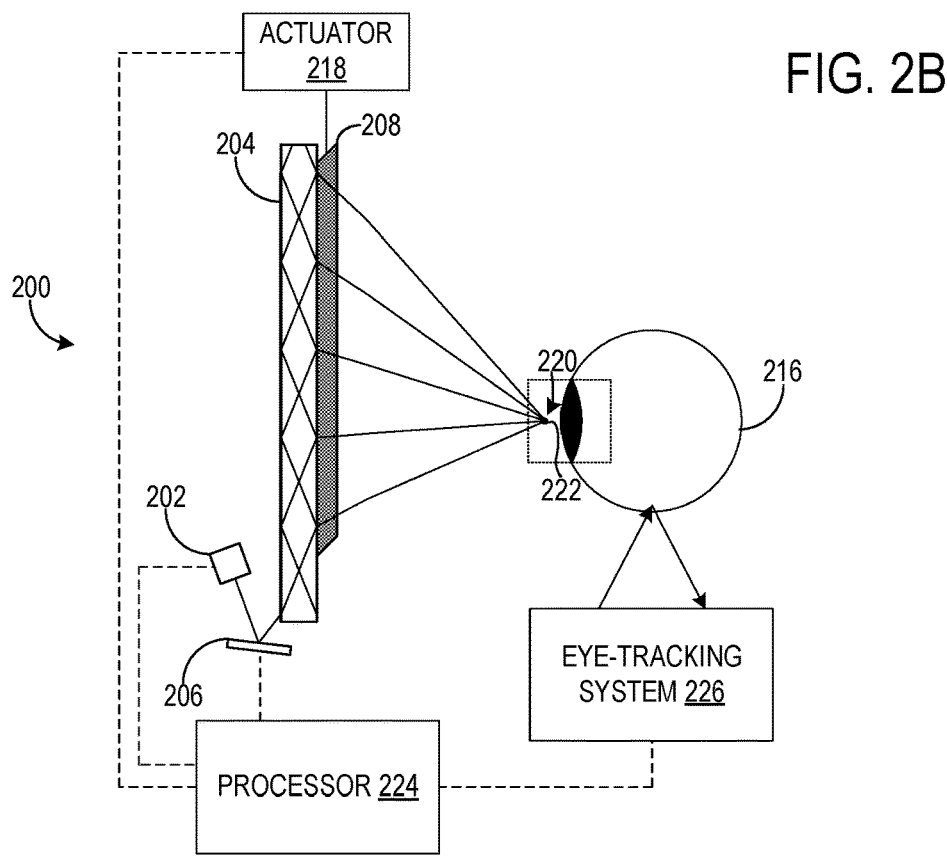
FIG. 2B shows an example display system that may be implemented in the HMD device of FIG. 1.

FIGS. 2A-2B show an example display system 200 that may be implemented in NED 102. Display system 200 is operable to variably position an exit pupil and provide a relatively large effective eyebox in which virtual imagery generated by the display system 200 is viewable. Further, the display system 200 is configured to prevent or substantially minimize aberrations that may occur due to steering of the exit pupil via shearing of an HOE to produce imagery substantially free of aberration. It will be understood that FIGS. 2A-2B show the example display system 200 schematically, and are not drawn to scale. FIGS. 3A-7, are similarly schematic in nature.

Display system 200 includes a light source 202 configured to introduce light into a waveguide 204 at a controllable light input angle. Light source 202 may output collimated light, which in some examples may be spatially modulated to create an image. In another example, light source 202 may output non-collimated light. Light source 202 may include any suitable optics for outputting light for creating and projecting images. The light source 202 may further include image-producing optics, such as a spatial light modulator for creating an image. The term "light source" is used herein as any suitable optics for outputting light to the other depicted components in the image, whether the light does or does not encode an image.

The light input angle at which light is introduced into waveguide 204 may be controllable in various manners. As one example, FIGS. 2A-2B show a scanning mirror 206 controllable to change the angle at which light from light source 202 is introduced into waveguide 204 when steering an exit pupil of the display system 200. In other examples, different light sources arranged at different angles may be used to vary a light input angle by selecting which light to use for illumination, or any other suitable method of varying a light input angle may be used. While not depicted in FIGS. 2A-2B, an in-coupling element may be provided to facilitate in-coupling of light into waveguide 204.

An optical device 208 coupled to the waveguide 204 may be configured to outcouple from the waveguide 204 light received from within the waveguide 204 that meets an angular condition. That is, the optical device 208 may be configured as a controllable exit grating for the waveguide 204 of the display system 200, such that the display system 200 may controllably outcouple light from the waveguide 204. For example, the optical device 208 may be sheared to change the angular condition, and thus control whether light received from within the waveguide 204 is outcoupled. In one example, the optical device 208 may include a flexible HOE, such as, for example, a Bragg grating that diffracts light having a range of incident angles that satisfy the Bragg condition of the grating. FIG. 2A shows, for a first light input angle, light outcoupled by the optical device 208 being focused at a focal point 210 in an exit pupil 212. The flexible HOE of the optical device 208 may encode optical power to focus the outcoupled light. For the first light input angle illustrated in FIG. 2A, the outcoupled, diffracted rays focused within exit pupil 212 form a substantially aberration-free image, which may be used to produce high-quality imagery in an eyebox 214, in which a user's pupil 216 is illustrated.

The display system 200 is further configured to control the output angle of light outcoupled from the flexible HOE of the optical device 208 by shearing the optical device. Thus, in one example, the display system 200 further includes a mechanical actuator 218 configured to controllably apply a shear force to the optical device 208. Shearing the optical device 208 including the flexible HOE may cause at least two changes: the Bragg condition is met at a different input angle, and when the Bragg condition is met, the output light has a different output angle than what was originally recorded for the flexible HOE. Additionally, finer shearing of the optical device 208 may be used to perform relatively fine adjustments to the exit pupil location for the same input angle.

Shear force may be applied to the optical device 208 in any suitable manner. In one example, the diffractive optics of the flexible HOE are interposed between and attached to substrates of the optical device 208 made of glass or other suitable materials. The diffractive optics may include a volume hologram having a thickness between 5 and 1500 microns, for example. The actuator 218 may be coupled to one of the substrates to selectively deflect the substrate and thereby apply a shear force to the diffractive optics. In some examples, actuator 208 may comprise one or more actuators (e.g., piezoelectric crystals) configured to deflect the substrate along a single axis, while in other examples actuators may be provided to deflect the substrate along multiple axes (e.g., perpendicular x and y axes), which may enable exit pupil placement in two directions. In a more specific example, actuator 218 may apply adjustments on the order of one micron to the optical device 208.

FIG. 2B shows an example where the actuator 218 has applied a shear force to the optical device 208. As shown, the optical device 208 is sheared, thus changing the input angle at which the Bragg condition is met. Accordingly, in this example, light emitted by light source 202 is introduced to waveguide 204 at a second input angle different from the first angle shown in FIG. 2A. The second input angle meets the Bragg condition of the sheared optical device, and the light is diffracted and outcoupled from the optical device toward an exit pupil 220 displaced from exit pupil 212, and focused at focal point 222. Thus, control of the light input angle and a shear force applied to the optical device 208 may allow a range of exit pupil locations (and potentially a continuous range) to be achieved. In the examples shown in FIGS. 2A and 2B, the display system 200 may further include a processor 224, which may take the form of processor 104 of the HMD device 100, and which may control scanning mirror 206 to adjust the angle of the light input into waveguide 204 and may control the actuator 218 to control a shear force applied to the optical device 208. In this manner, the processor 224 may be configured to control the light input angle and the shear force applied to the optical device 208 to control a light output angle from the display system 200, and thus direct the light from the light source 202 to a target exit pupil location.

In some examples, display system 200 may vary the exit pupil location based on the location of a user's pupil. Thus, FIGS. 2A-2B show an eye-tracking system 226 configured to identify the location of a user's pupil. In some examples, eye-tracking system 226 may include a light source that projects light onto the eye, and an image sensor that captures light reflected from the cornea with which glints and/or other features can be identified to determine the pupil location. The pupil location identified by eye-tracking system 226 may be provided to a processor 224. In these example, the processor 224 may be further configured to control the light input angle and the shear force applied to the optical device 208 based at least upon eye-tracking data from the eye-tracking system 226. For example, the processor 224 may be configured to control the light input angle and the shear force applied to the optical device 208 to continuously direct the light towards the user's pupil as the user looks around and rotates their eye as tracked by the eye-tracking system 226. The eye-tracking data may include data indicating rotations of the user's eye, a position of the user's pupil, and other types of eye-tracking data that may be measured by the eye-tracking system 226.

Similarly, the display system 200 may vary a depth of the exit pupil location. In these examples, the processor 224 is further configured to control the light input angle and the shear force applied to the optical device 208 to focus the light at different depths. For example, holograms encoded in the flexible HOE may modulate light from the light source 202 to focus the light at a particular depth. By controlling the depth at which light from the light source 202 is focused, the display system 200 may display images that are perceived by the user to be located at various depths.

In some examples, waveguide 204 may have another geometry than the flat, rectangular shape shown in FIGS. 2A-2B. For example, the waveguide may have the shape of a wedge or a curved wedge. Moreover, the focusing of light outcoupled from waveguide 204 provided by optical power encoded in the flexible HOE of the optical device 208 may instead be provided by a lens. However, optical power encoded in flexible HOE of the optical device 208 may enable the addition of Zernike coefficients and/or the direction of diffracted light onto a surface suited for movement of a user's pupil. The encoded optical power may also increase the field of view in a generated eyebox, though with a reduction in the size of an exit pupil. By variably positioning the exit pupil, however, the correspondence between exit pupil location and user pupil location may be maintained.

In one example, the flexible HOE of the optical device 208 may encode one hologram. Mechanically shearing the flexible HOE will cause the Bragg condition for the encoded hologram to be met at a different input angle. Thus, the display system 200 may control the input light angle to meet the Bragg condition of the sheared flexible HOE. When the Bragg condition of the sheared HOE is met, the output light will have a different output angle than what was originally recorded for the encoded hologram. In this manner, a flexible HOE that encodes one hologram may be mechanically sheared to control a light output angle from the display system 200. However, as discussed above, if the flexible HOE has a non-uniform grating vector (e.g. diffracts the incident light into a non-collimated beam), applying a uniform shear to the surface of the flexible HOE may introduce aberrations into the light output from the display system. Thus, the optical device 208 may be configured to apply a variable shear across the flexible HOE to minimize these aberrations, as discussed below with respect to FIGS. 4A-7.

In another example, the flexible HOE of the optical device 208 comprises multiple angularly multiplexed holograms, such that the flexible HOE has a plurality of encoded holograms. In one example, the plurality of encoded holograms are configured to diffract light received at the flexible HOE toward a plurality of different light output angles. For example, each hologram of the angularly multiplexed holograms may be configured to meet the Bragg condition for different angles of incident light, and to diffract light toward a respective exit pupil. By matching the angle of light incident on the flexible HOE of the optical device 208 to an acceptance range for a desired hologram of the flexible HOE, outcoupled light can be selectively steered among exit pupils for the multiplexed holograms. As such, the processor 224 may be configured to control the light input angle to achieve a hologram-specific incidence angle for a target hologram that will diffract the light toward a target exit pupil. As discussed above, the processor 224 may further control a shear force applied to the optical device 208 by the actuator 218 to further adjust the target exit pupil location.

In this example, the output angle of light diffracted by the flexible HOE of optical device 208 may be related to the input angle of light incident on the flexible HOE by a functional relation of the following form: Output Angle=F (Input Angle). F(Input Angle) may be a function determined by the flexible HOE of the optical device 208, and may be represented by a matrix. With this relation, a relatively small change in input angle may cause a relatively larger change in output angle. In these examples, the output angles may comprise a discrete set of output angles associated with each hologram encoded in the flexible HOE of optical device 208.

Figure 3A:
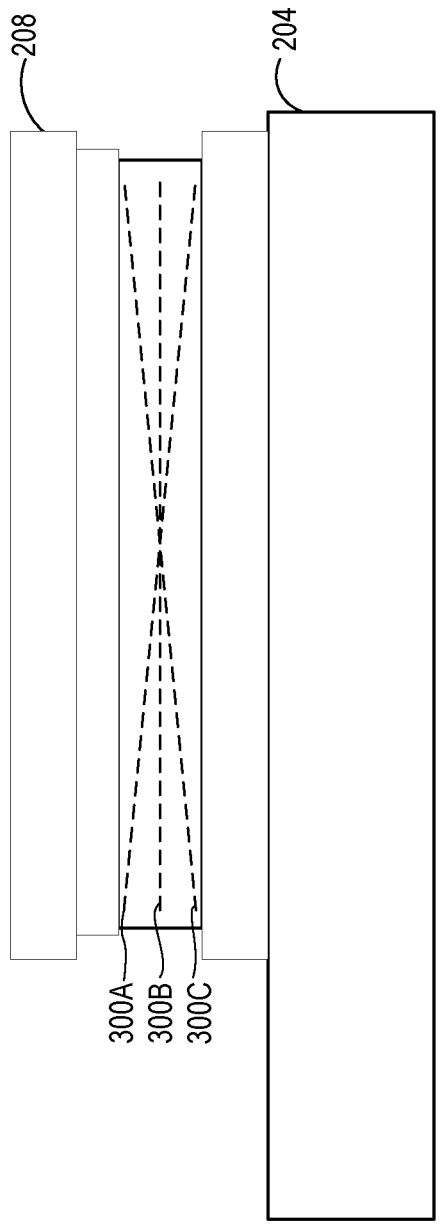
FIG. 3A shows a cross-sectional view of a waveguide and a flexible holographic optical element (HOE) for the example display system that may be implemented in the HMD device of FIG. 1.

FIG. 3A shows a schematic depiction of three multiplexed holograms 300A, 300B, and 300C encoded in the flexible HOE of optical device 208. Each hologram 300A-C includes a respective angular acceptance range or bandwidth—e.g., the range of incidence angles at which the Bragg condition is met—and a respective exit pupil toward which the hologram diffracts light. The total range of light input angles and incidence angles sufficient to access each hologram 300A-C may be a function of the number of holograms in the flexible HOE of optical device 208 and the angular acceptance range for each hologram. As such, angular acceptance, hologram number, and total angular range sufficient to access each hologram may be balanced in the flexible HOE of optical device 208 to achieve desired optical performance. In one example, the plurality of encoded holograms of the flexible HOE of optical device 208 are configured to focus light received at the flexible HOE at a plurality of different depths. Further, the flexible HOE of optical device 208 may include multiple holograms designed for the same incidence angles but different wavelengths of light. For example, the flexible HOE of optical device 208 may include three holograms designed for the same incidence angles but configured to diffract light in red, green, and blue wavelength ranges, respectively.

Figure 3B:
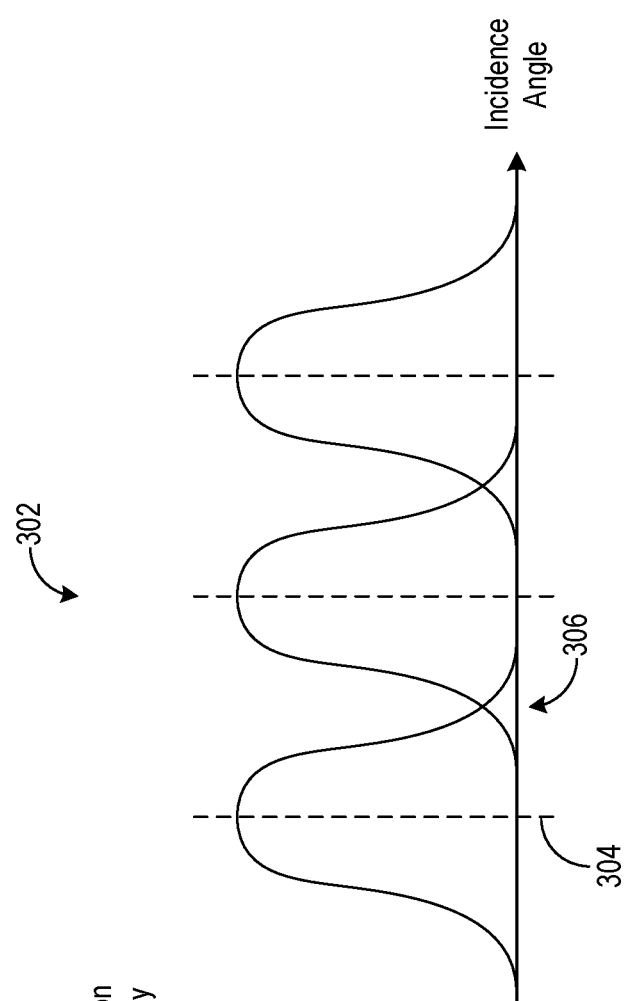
FIG. 3B shows a graph illustrating the spectral response of holograms encoded in the flexible HOE of FIG. 3A.

FIG. 3B shows a graph 302 illustrating an example spectral response of three holograms encoded in a flexible HOE, such as the flexible HOE of optical device 208. The diffraction efficiency of each hologram is shown as a function of the light incidence angle. Light input angles at or near the central angle (e.g. 304) for each hologram may achieve a suitably high diffraction efficiency from a desired hologram while avoiding diffraction from angularly adjacent holograms. FIG. 3B also illustrates incidence angle ranges (e.g., range 306) where the spectral response of adjacent holograms overlaps, potentially introducing crosstalk between the holograms where light incident in these ranges may be diffracted by two holograms. Crosstalk between the holograms potentially limits the number of holograms that may be encoded on a single flexible HOE.

By mechanically shearing the flexible HOE, the respective exit pupils of each hologram may be further controlled. As discussed previously, shearing the flexible HOE will change the incident angle at which the Bragg condition is met for each of the holograms. Additionally, changing the light input angle to meet the changed Bragg condition will further cause the output angle of the hologram to be different from the originally recorded one. For example, courser changes in output light angle may be controlled by selecting a suitable hologram of a plurality of multiplexed holograms via controlling the light input angle, and finer changes in output light angle may be controlled by mechanically shearing the flexible HOE to change the light input angle that the Bragg condition of the selected hologram is met. In this manner, the light input angle and the shear force applied to the flexible hologram may be controlled to produce a smooth deflection or movement of the focal point of the output beam.

As discussed previously, uniformly shearing a flexible HOE may introduce aberrations into the output light. FIG. 4A schematically shows an optical device 208 configured to variable shear the surface of a flexible HOE 400. As shown, the optical device 208 includes a first rigid substrate 402, the flexible holographic optical element 400, a transparent flexible material 404 having a variable shear transmission property across an in-plane direction of the flexible holographic optical element, and a second rigid substrate 406. As shown, the flexible holographic optical element 400 and the transparent flexible material 404 are located between the first and second rigid substrates 402, 406. For example, the flexible holographic optical element 400 and the transparent flexible material 404 may be sandwiched between the first and second rigid substrates 402, 406. In other examples, additional layers may also be located between the first and second rigid substrates alongside the flexible holographic optical element 400 and the transparent flexible material 404. For example, multiple flexible materials 404 may be sandwiched between the first and second rigid substrates 402, 406.

In one example, the flexible HOE 400 is a flexible volume hologram. In another example, the flexible HOE 400 is a flexible volume Bragg grating. However, it will be appreciated that the flexible HOE 400 may take other forms, such as, for example, surface Bragg gratings, switchable Bragg gratings, and/or other static or dynamic technologies that can act as a thin or thick volume hologram and are shearable to affect the Bragg condition. In these examples, the flexible HOE 400 may have a non-uniform grating vector, such as, for example, when the flexible HOE 400 is configured to be illuminated with a non-collimated beam, and/or the flexible HOE 400 is configured to diffract incident light into a non-collimated beam.

Figure 4B:
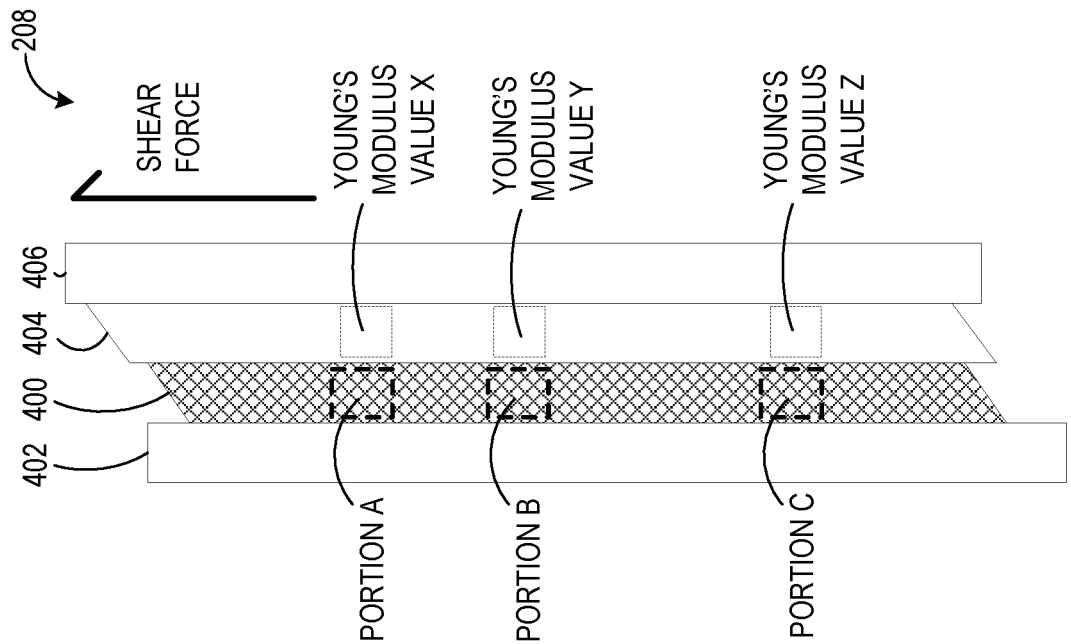
FIG. 4B shows a cross-section view of the example optical device of FIG. 4A that has been sheared.
Figure 4A:
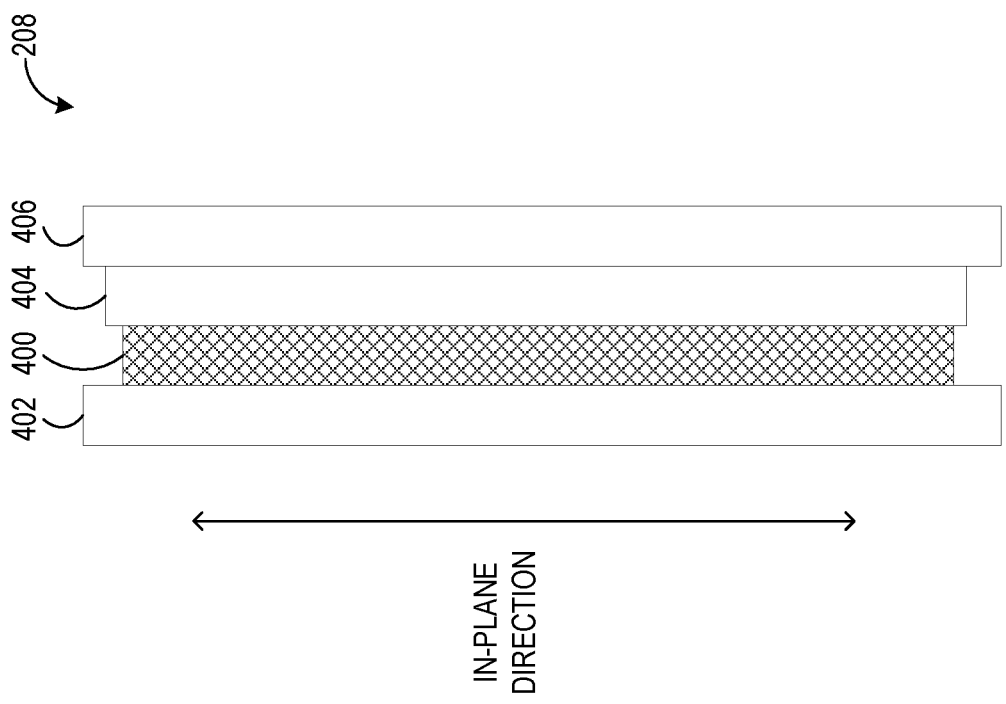
FIG. 4A shows a cross-sectional view of an example optical device for the example display system that may be implemented in the HMD device of FIG. 1.

FIG. 4B shows an example where the optical device 208 has been mechanically sheared, such as, for example, by the actuator 218 of the display system 200. In this example, a uniform shear force has been applied to the second rigid substrate 406. The shear force is transmitted to the flexible HOE 400 through the transparent flexible material 404. The variable shear transmission property of the transparent flexible material 404 transmits variable amounts of the shear force applied to the first or second rigid substrates across the in-plane direction of the flexible holographic optical element 400. Thus, the uniform shear force applied to the second rigid substrate 406 is variably transmitted to the flexible HOE 400 such that different portions of the surface of the flexible HOE 400 receive different amounts of shear. The transparent flexible material 404 has flexibility (Young's modulus value(s)) on the same order as the flexible HOE material. Thus, shear strain is shared between the flexible HOE and transparent flexible material 404. In the illustrated example, portion A of the flexible HOE 400 receives a different amount of the shear force applied to the second rigid substrate than a portion B and/or a portion C of the same flexible HOE 400. The amount of shear transmitted to each particular portion of the flexible HOE 400 may be controlled via the variable shear transmission property of the transparent flexible material 404.

In the example illustrated in FIG. 4B, the variable shear transmission property of the transparent flexible material 404 is achieved at least in part by the transparent flexible material 404 having a variable Young's modulus across the in-plane direction. As shown, the transparent flexible material 404 may be manufactured such that different portions of the transparent flexible material 404 have different Young's modulus values. For example, a portion of the transparent flexible material 404 touching the portion A of the flexible HOE 400 may have a Young's modulus value X, while a portion of the transparent flexible material 404 touching the portion B of the flexible HOE 400 may have a Young's modulus value Y that is different than the Young's modulus value X. Thus, each portion of the flexible HOE 400 will receive an amount of the uniform shear force applied to the second rigid substrate 406 proportional to the Young's modulus value of the intervening portion of the transparent flexible material 404. In this manner, the transparent flexible material 404 may be manufactured to achieve a suitable variable shear force pattern that is transmitted to the flexible HOE 400. It will be appreciated that the variable Young's modulus of the transparent flexible material 404 may be achieved via different manufacturing methods. For example, by inducing stress in the transparent flexible material, treating the transparent flexible material during manufacturing using light head or another technique in order to harden portions of the transparent flexible material, and/or including thin layers of piezoelectric materials or electroelastomers, etc.

Figure 5B:
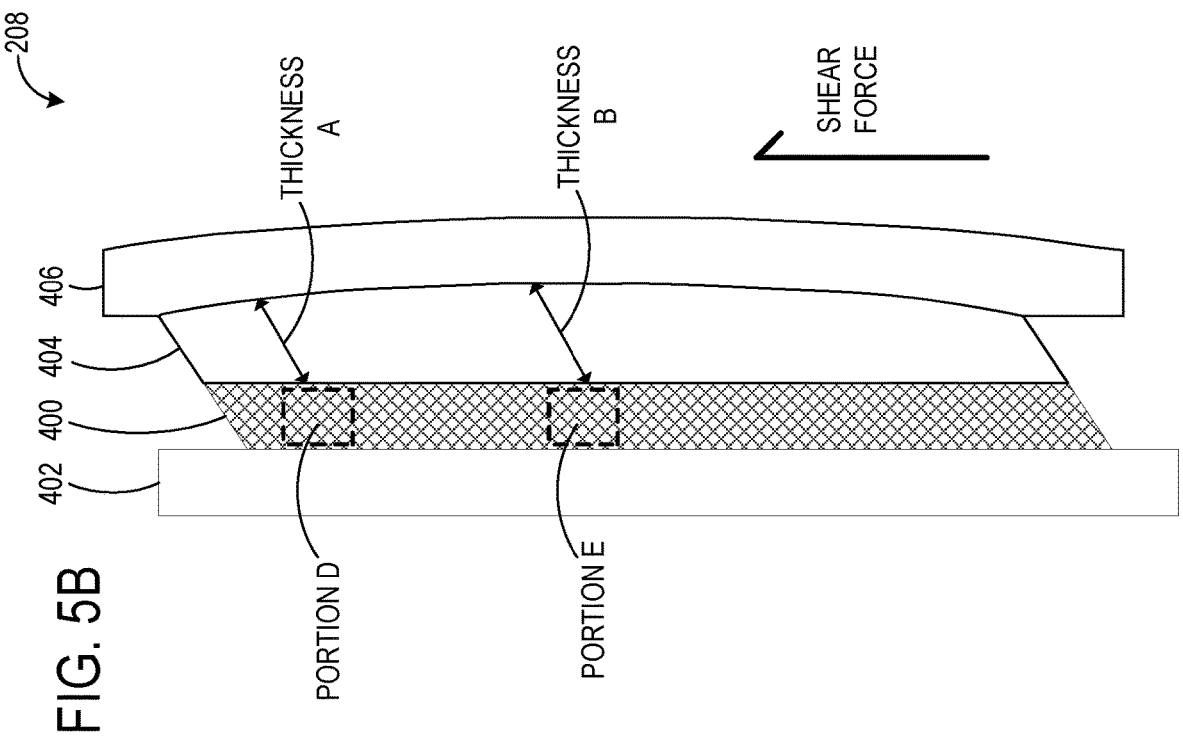
FIG. 5B shows a cross-section view of the example optical device of FIG. 5A that has been sheared.
Figure 5A:
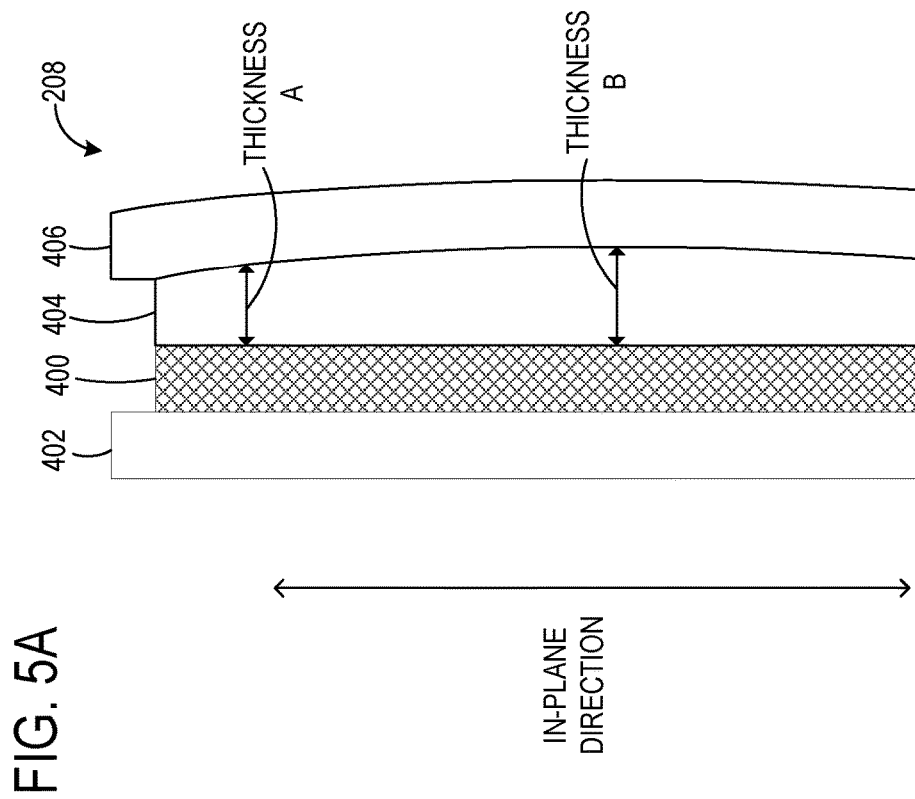
FIG. 5A shows a cross-sectional view of another example optical device for the example display system that may be implemented in the HMD device of FIG. 1.

In the example illustrated in FIG. 5A, the variable shear transmission property of the transparent flexible material 404 is achieved at least in part by the transparent flexible material 404 having a variable thickness across the in-plane direction. In the illustrated example, the transparent flexible material 404 has a greater thickness in the middle than at the edges of the transparent flexible material 404. That is, the thickness B of the transparent flexible material 404 is greater than the thickness A of the transparent flexible material 404. In this example, the transparent flexible material 404 may have a uniform Young's modulus value. Thus, the portions of the transparent flexible material 404 having greater thickness will transmit less shear force than the portions of the transparent flexible material 404 having less thickness. In another example, both the Young's modulus and the thickness of the transparent flexible material 404 may be varied across the in-plane direction to achieve a more complex pattern of the variable shear transmission property.

FIG. 5B shows a uniform shear force being applied to the second rigid substrate 406. In this example, less of the shear force applied to the second substrate 406 will be transmitted through the thicker portion of the transparent flexible material 404 having the thickness B than will be transmitted through the thinner portion of the transparent flexible material 404 having the thickness A. Thus, the portion D of the flexible HOE 400 will receive more shear force than the portion E of the flexible HOE 400. By varying the thickness of the transparent flexible material 404, the pattern of the variable shear transmission property may be controlled.

Figure 6:
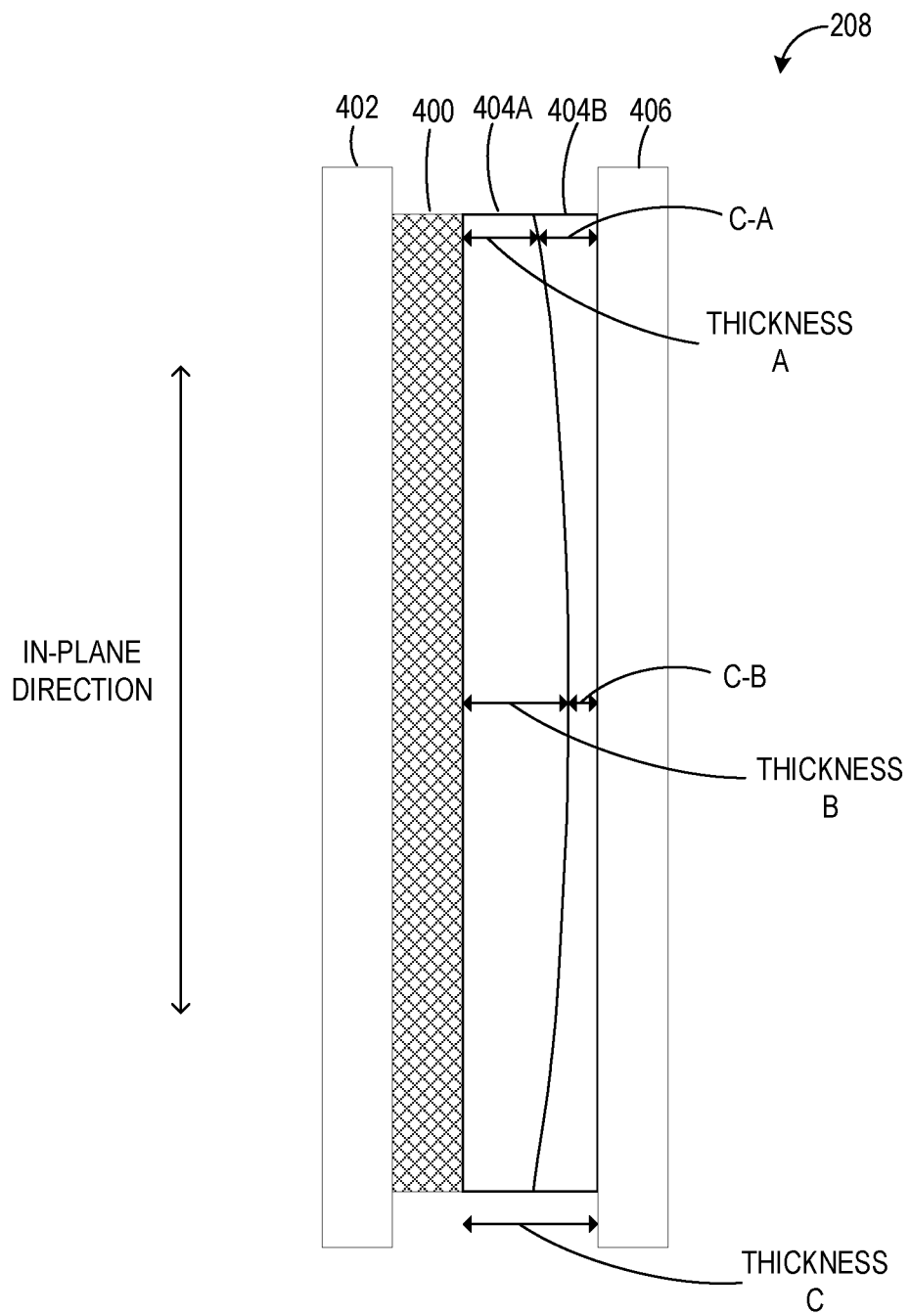
FIG. 6 shows a cross-sectional view of another example optical device for the example display system that may be implemented in the HMD device of FIG. 1.

FIG. 6 shows an example optical device 208 that further includes at least two transparent flexible materials 404A, 404B having different variable shear transmission properties across the in-plane direction. The at least two transparent flexible materials 404A, 404B may form a stack that is located between the flexible HOE 400 and the first or second rigid substrates 402, 406. In another example, the at least two transparent flexible materials 404A, 404B may be located on either side of the flexible HOE 400. Controlling the different variable shear transmission properties of the at least two transparent flexible materials 404A, 404B may potentially improve control of the amount of shear that is applied to each position of the flexible HOE 400. In one example, the at least two transparent flexible materials 404A, 404B each have different flexibility. By varying the proportions of the at least two transparent flexible materials at each location on the flexible HOE 400, the combined flexibility of the at least two transparent flexible materials can be controlled.

In the example illustrated in FIG. 6, the at least two transparent flexible materials 404A, 404B have corresponding variable thicknesses such that a stack of the at least two transparent flexible materials 404A, 404B has a substantially uniform thickness across the in-plane direction. That is, the combined layer of the at least two transparent flexible materials 404A, 404B has a substantially uniform thickness C, even though the individual transparent flexible materials within the combined layer have varying thicknesses. For example, a first transparent flexible material 404A may have a first thickness A at the edge that is less than a second thickness B at the middle. However, the second transparent flexible material 404B has a corresponding thickness at each position such that the first and second transparent flexible materials have a combined thickness C. Thus, in the illustrated example, the second transparent flexible material 404B has an edge thickness equal to thickness C–thickness A of the first transparent flexible material 404A, and a middle thickness equal to thickness C–thickness B of the first transparent flexible material 404A. While the combined thickness of the at least two transparent flexible materials 404A, 404B is constant across the in-plane direction, the relative proportions between the at least two transparent flexible materials changes, thus having a variable sheer transmission property across the in-plane direction. While the example illustrated in FIG. 6 only includes two transparent flexible materials, it will be appreciated that any suitable number of transparent flexible materials may be used.

Figure 7:
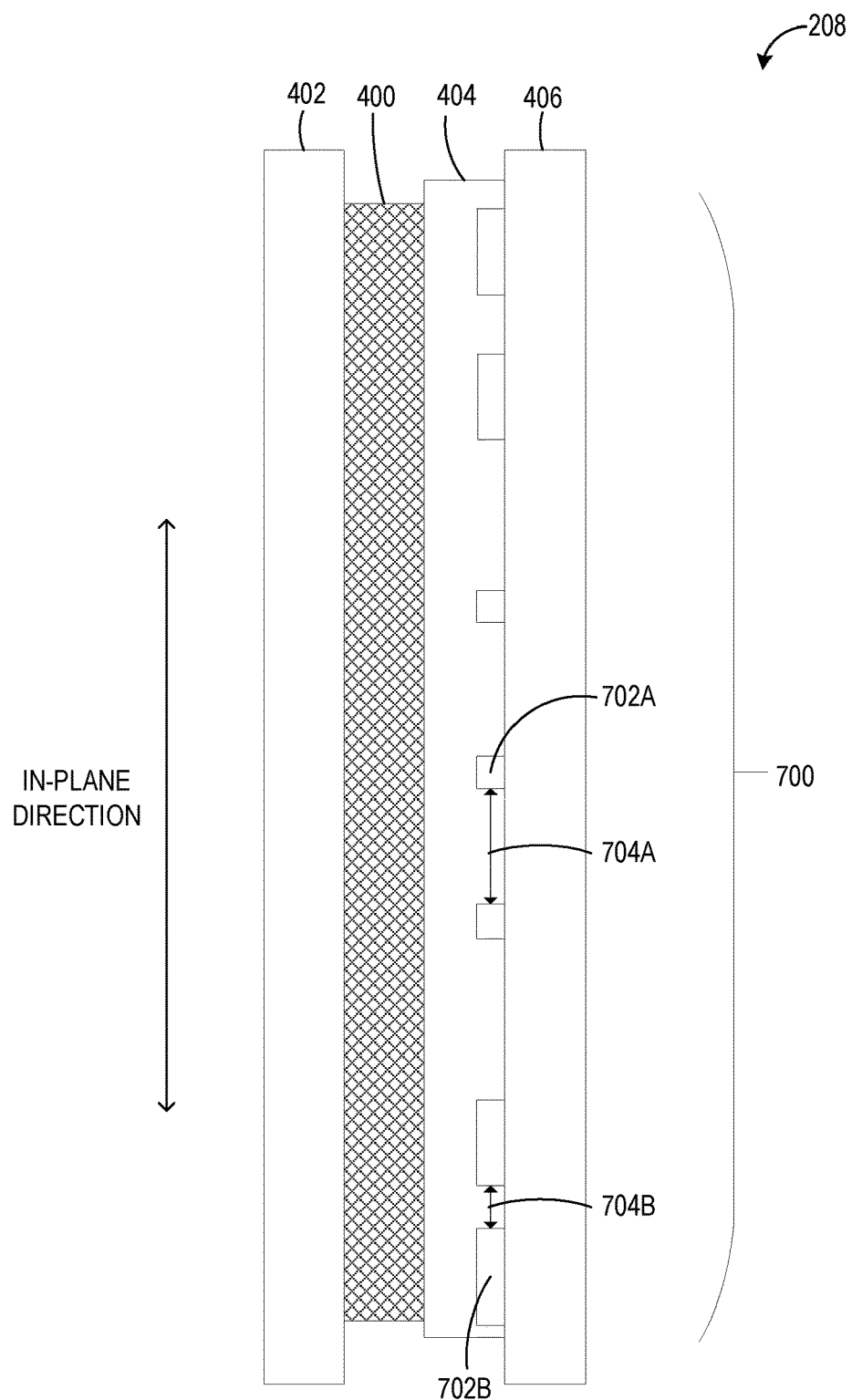
FIG. 7 shows a cross-sectional view of another example optical device for the example display system that may be implemented in the HMD device of FIG. 1.

FIG. 7 shows an example optical device 208 where the variable shear transmission property of the transparent flexible material 404 is achieved at least in part by the transparent flexible material 404 having a pattern of gaps 700 across the in-plane direction. The pattern of gaps 700 introduces "weaknesses" into the transparent flexible material 404. By varying the pattern of gaps 700, the flexibility of the transparent flexible material 404 will also vary across the in-plane direction. In the illustrated example, the pattern of gaps 700 have a variable spacing or size of gaps in the in-plane direction. For example, a first gap 702A of the pattern of gaps 700 near the middle of the transparent flexible material 404 has a smaller size than a second gap 702B near the edge of the transparent flexible material 404. Additionally, a first space 704A between gaps near the middle of the transparent flexible material 404 is larger than a second space 704B between gaps near the edge of the transparent flexible material 404. Thus, due to this pattern of spacing and size of gaps, the middle of the transparent flexible material 404 has a higher proportion of material to gap compared to the edge of the transparent flexible material 404.

In one example, each of the gaps of the pattern of gaps 700 form an airgap, and are filled with air and/or one or more gases. As these airgaps do not transmit shear from the second rigid substrate 406 to the flexible HOE 400, the variable shear transmission property of the transparent flexible material 404 will be proportional to the ratio of material to airgap at each position.

In another example, each of the gaps of the pattern of gaps 700 in the transparent flexible material 404 are filled with a material having a different Young's modulus than the transparent flexible material 404 and a same refractive index as the transparent flexible material 404. By matching the reflective index of the filler material to be the same or substantially the same as the refractive index as the transparent flexible material 404, potential aberrations to light passing through the transparent flexible material 404 may be minimized. Additionally, due to the filler material having a different Young's modulus than the transparent flexible material 404, the variable shear transmission property of the transparent flexible material 404 will be proportional to the ratio of transparent flexible material to filler material at each position. Thus, in these examples, the pattern of gaps 700 may be manufactured to achieve a suitable pattern of shear transmission for the holograms encoded in the flexible HOE 400 of that particular optical device 208. It will be appreciated that although the pattern of gaps 700 are illustrated as being located across a surface of the transparent flexible material 404 in FIG. 7, that the pattern of gaps 700 may be located internally of the transparent flexible material 404.

It will be appreciated that the above examples of optical devices 208 that transmit light are merely exemplary. In other examples, the optical device 208 may be configured to reflect light. Thus, another configuration of the display system 200 may locate the optical device 208 on an opposite side of the waveguide 204 from the user's eye 216, such that the light is outcoupled from the waveguide 204 and reflected off the optical device 208 towards a target exit pupil near the user's eye 216.

Figure 8:
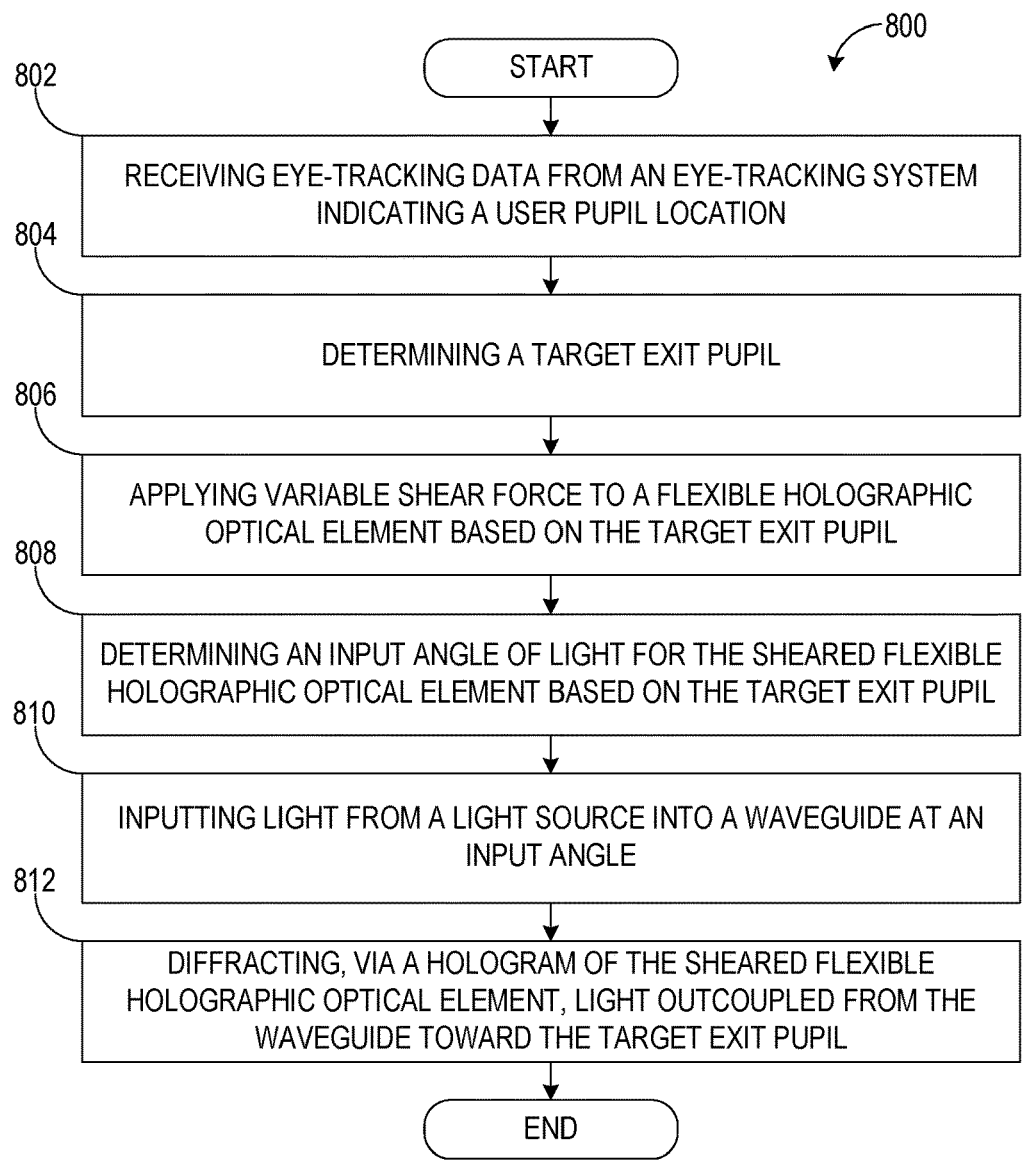
FIG. 8 shows a flowchart illustrating a method of variably shearing a flexible HOE for the display system 200 implemented in the HMD device of FIG. 1.

FIG. 8 shows a flowchart illustrating an example method 800. Method 800 may be implemented in one or more of the display systems described herein, for example.

At 802, method 800 may include receiving eye-tracking data from an eye-tracking system indicating a user pupil location. The eye-tracking data may include data indicating rotations of the user's eye, a position of the user's pupil, and other types of eye-tracking data that may be measured by the eye-tracking system 226. At 804, method 800 may include determining a target exit pupil for a display system. In one example, the method 800 may include determining the target exit pupil based at least on eye-tracking data from the eye-tracking system received at 802. For example, the display system implementing the method 800 may be configured to track a pupil location of the user's eye, and place the exit pupil of the display system at or near the pupil location of the user's eye as the user looks around.

At 806, method 800 may include applying variable shear force to a flexible holographic optical element based on the target exit pupil, the variable shear force applying a variable amount of shear force in an in-plane direction of the holographic optical element. As discussed previously, HOEs configured to be illuminated with a non-collimated beam, and/or diffracting the light of an incident collimated beam into a non-collimated beam may have non-uniform grating vectors, and thus the amount of shear required for each position on the HOE may be different. For example, when the fringes of the HOE are nearly parallel to a substrate that the shear is applied to, the amount of shear required to go out of Bragg condition is large (goes to infinity as the fringes become parallel). On the other hand, when the fringes are perpendicular to the substrate, the amount of shear required to go out of Bragg condition is small. Thus, applying a uniform shear to an HOE with a non-uniform grating vector may cause the diffracted beam to become highly aberrated. By applying a variable shear force in the in-plane direction across the surface of the flexible HOE at step 806, the method 800 may minimize potentially aberrations.

In one example, the flexible HOE is included in an optical device of the display system implementing method 800. The optical device may comprise a first rigid substrate, a flexible holographic optical element, a transparent flexible material having a variable shear transmission property across an in-plane direction of the flexible holographic optical element, and a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element. In this example, applying variable shear force at 806 of method 800 may include applying a shear force to the first rigid substrate, and transmitting the shear force according to the variable shear transmission property of the transparent flexible material to the flexible holographic optical element.

At 808, method 800 may include determining an input angle of light for the sheared flexible holographic optical element based on the target exit pupil. The input angle of light may be an angle that causes light input into the waveguide of the display system implementing method 800 to arrive at the flexible HOE at a corresponding angle of incidence at which the flexible HOE diffracts the light toward the target exit pupil. The input angle of light may be further determined based on the variable shear force applied to the flexible HOE. The flexible HOE may be configured to outcouple and diffract light received from within the waveguide that meets an angular condition of the variable sheared flexible HOE. As discussed previously, shearing the flexible HOE will change the incident angle at which the Bragg condition is met for each hologram encoded in the flexible HOE. Additionally, changing the light input angle to meet the changed Bragg condition will further cause the output angle of the hologram to be different from the originally recorded one. In this manner, method 800 may include controlling the variable shear force applied to the flexible HOE and controlling the angle of light incident on the flexible HOE to control an output angle of the outcoupled light.

At 810, method 800 may include inputting light from a light source into a waveguide at the input angle. For example, at 810, the method 800 may include inputting light from the light source into the waveguide at the input angle determined at 808. At 812, method 800 may include diffracting, via a hologram of the sheared flexible holographic optical element, light outcoupled from the waveguide toward the target exit pupil. Method 800 may include iterating through 802 to 812 to continually track the user's eye and diffract light toward the user's changing eye positions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
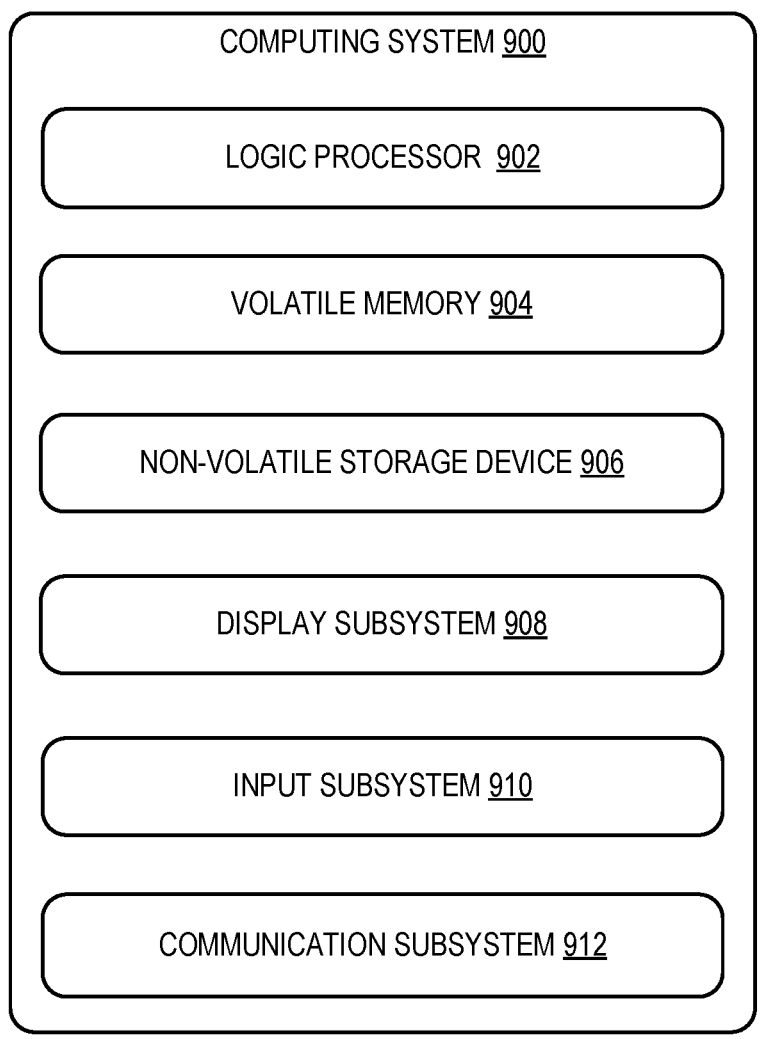
FIG. 9 shows a block diagram of an example computing device.

FIG. 9 schematically shows a non-limiting embodiment of a computing system 900 that can enact one or more of the methods and processes described above. Computing system 900 is shown in simplified form. Computing system 900 may embody the HMD device 100 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902, volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 106 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FP GAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, inertial measurement unit, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides an optical device comprising a first rigid substrate, a flexible holographic optical element, a transparent flexible material having a variable shear transmission property across an in-plane direction of the flexible holographic optical element, and a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element. In this aspect, additionally or alternatively, the flexible holographic optical element may be a flexible volume Bragg grating. In this aspect, additionally or alternatively, the flexible holographic optical element may be a flexible volume hologram. In this aspect, additionally or alternatively, the flexible holographic optical element may have a non-uniform grating vector. In this aspect, additionally or alternatively, the variable shear transmission property of the transparent flexible material may be achieved at least in part by the transparent flexible material having a variable thickness across the in-plane direction. In this aspect, additionally or alternatively, the variable shear transmission property of the transparent flexible material may be achieved at least in part by the transparent flexible material having a variable Young's modulus across the in-plane direction. In this aspect, additionally or alternatively, the variable shear transmission property of the transparent flexible material may be achieved at least in part by the transparent flexible material having a pattern of gaps across the in-plane direction, the pattern of gaps having a variable spacing or size of gaps in the in-plane direction. In this aspect, additionally or alternatively, gaps of the pattern of gaps in the transparent flexible material may be filled with a material having a different Young's modulus than the transparent flexible material and a same refractive index as the transparent flexible material. In this aspect, additionally or alternatively, the optical device may further comprise at least two transparent flexible materials having different variable shear transmission properties across the in-plane direction. In this aspect, additionally or alternatively, the at least two transparent flexible materials may have corresponding variable thicknesses such that a stack of the at least two transparent flexible materials has a substantially uniform thickness across the in-plane direction. In this aspect, additionally or alternatively, the optical device may be configured as a controllable exit grating for a waveguide of a display system. In this aspect, additionally or alternatively, the flexible holographic optical element may have a plurality of encoded holograms. In this aspect, additionally or alternatively, the plurality of encoded holograms may be configured to diffract light received at the flexible holographic optical element toward a plurality of different light output angles. In this aspect, additionally or alternatively, the plurality of encoded holograms may be configured to focus light received at the flexible holographic optical element at a plurality of different depths.

Another aspect provides a display system, comprising a waveguide, a light source configured to introduce light into the waveguide at a controllable light input angle, an optical device configured to outcouple from the waveguide light received from within the waveguide that meets an angular condition, the optical device comprising a first rigid substrate, a flexible holographic optical element, a transparent flexible material having a variable shear transmission property across the in-plane direction of the flexible holographic optical element, and a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element, a processor configured to control the light input angle and the shear force applied to the optical device to control a light output angle from the display system. In this aspect, additionally or alternatively, the display system may further comprise an eye-tracking system configured to identify a user pupil location, and wherein the processor may be further configured to control the light input angle and the shear force applied to the optical device based at least upon eye-tracking data from the eye-tracking system. In this aspect, additionally or alternatively, the processor may be further configured to control the light input angle and the shear force applied to the optical device to focus the light at different depths.

Another aspect provides a method, comprising, determining a target exit pupil, applying variable shear force to a flexible holographic optical element based on the target exit pupil, the variable shear force applying a variable amount of shear force in an in-plane direction of the holographic optical element, inputting light from a light source into a waveguide at an input angle, and diffracting, via a hologram of the sheared flexible holographic optical element, light outcoupled from the waveguide toward the target exit pupil. In this aspect, additionally or alternatively, the method may further comprise determining the target exit pupil based at least on eye-tracking data from an eye-tracking system. In this aspect, additionally or alternatively, the flexible holographic optical element may be included in an optical device comprising a first rigid substrate, the flexible holographic optical element, a transparent flexible material having a variable shear transmission property across an in-plane direction of the flexible holographic optical element, and a second rigid substrate, wherein the flexible holographic optical element and the transparent flexible material may be located between the first and second rigid substrates, wherein the variable shear transmission property of the transparent flexible material may transmit variable amounts of a shear force applied to the first or second rigid substrates across the in-plane direction of the flexible holographic optical element, and wherein applying variable shear force may include applying a shear force to the first rigid substrate, and transmitting the shear force according to the variable shear transmission property of the transparent flexible material to the flexible holographic optical element.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. An optical device comprising:
  a first rigid substrate;
  a flexible holographic optical element;

a transparent flexible material having a variable shear transmission property across an in-plane direction of the flexible holographic optical element; and a second rigid substrate, wherein the flexible holographic optical element and the transparent flexible material are located between the first and second rigid substrates; wherein the variable shear transmission property of the transparent flexible material transmits variable amounts of a shear force applied to the first or second rigid substrates across the in-plane direction of the flexible holographic optical element, wherein the variable amounts of shear force transmitted by the transparent flexible material to the flexible holographic optical element is configured to control an angle at which light is incident to the flexible holographic optical element.

2. The optical device of claim 1, wherein the flexible holographic optical element is a flexible volume Bragg grating.

3. The optical device of claim 1, wherein the flexible holographic optical element is a flexible volume hologram.

4. The optical device of claim 1, wherein the flexible holographic optical element has a non-uniform grating vector.

5. The optical device of claim 1, wherein the variable shear transmission property of the transparent flexible material is achieved at least in part by the transparent flexible material having a variable thickness across the in-plane direction.

6. The optical device of claim 1, wherein the variable shear transmission property of the transparent flexible material is achieved at least in part by the transparent flexible material having a variable Young's modulus across the in-plane direction.

7. The optical device of claim 1, wherein the variable shear transmission property of the transparent flexible material is achieved at least in part by the transparent flexible material having a pattern of gaps across the in-plane direction, the pattern of gaps having a variable spacing or size of gaps in the in-plane direction.

8. The optical device of claim 7, wherein gaps of the pattern of gaps in the transparent flexible material are filled with a material having a different Young's modulus than the transparent flexible material and a same refractive index as the transparent flexible material.

9. The optical device of claim 1, further comprising at least two transparent flexible materials having different variable shear transmission properties across the in-plane direction.

10. The optical device of claim 9, wherein the at least two transparent flexible materials have corresponding variable thicknesses such that a stack of the at least two transparent flexible materials has a substantially uniform thickness across the in-plane direction.

11. The optical device of claim 1, wherein the optical device is configured as a controllable exit grating for a waveguide of a display system.

12. The optical device of claim 1, wherein the flexible holographic optical element has a plurality of encoded holograms.

13. The optical device of claim 12, wherein the plurality of encoded holograms are configured to diffract light received at the flexible holographic optical element toward a plurality of different light output angles.

14. The optical device of claim 12, wherein the plurality of encoded holograms are configured to focus light received at the flexible holographic optical element at a plurality of different depths.

15. A display system, comprising:
a waveguide;
a light source configured to introduce light into the waveguide at a controllable light input angle;
an optical device configured to outcouple from the waveguide light received from within the waveguide that meets an angular condition, the optical device comprising:
a first rigid substrate;
a flexible holographic optical element;
a transparent flexible material having a variable shear transmission property across an in-plane direction of the flexible holographic optical element; and
a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element, and wherein the variable amounts of shear force transmitted by the transparent flexible material to the flexible holographic optical element is configured to control an angle at which light is incident to the flexible holographic optical element; and
a processor configured to control the light input angle and the shear force applied to the optical device to control a light output angle from the display system.

16. The display system of claim 15, further comprising an eye-tracking system configured to identify a user pupil location, and wherein the processor is further configured to control the light input angle and the shear force applied to the optical device based at least upon eye-tracking data from the eye-tracking system.

17. The display system of claim 15, wherein the processor is further configured to control the light input angle and the shear force applied to the optical device to focus the light at different depths.

18. A method, comprising:
determining a target exit pupil;
applying variable shear force to a flexible holographic optical element based on the target exit pupil, the variable shear force applying a variable amount of shear force in an in-plane direction of the holographic optical element;
inputting light from a light source into a waveguide at an input angle; and
diffracting, via a hologram of the sheared flexible holographic optical element, light outcoupled from the waveguide toward the target exit pupil, wherein the variable amounts of shear force transmitted by the transparent flexible material to the flexible holographic optical element is configured to control an angle at which light is incident to the flexible holographic optical element.

19. The method of claim 18, further comprising determining the target exit pupil based at least on eye-tracking data from an eye-tracking system.

20. The method of claim 18, wherein the flexible holographic optical element is included in an optical device comprising a first rigid substrate, the flexible holographic optical element, a transparent flexible material having a variable shear transmission property across an in-plane direction of the flexible holographic optical element, and a second rigid substrate, wherein the flexible holographic optical element and the transparent flexible material are located between the first and second rigid substrates, wherein the variable shear transmission property of the transparent flexible material transmits variable amounts of a shear force applied to the first or second rigid substrates across the in-plane direction of the flexible holographic optical element; and wherein applying variable shear force includes:

applying a shear force to the first rigid substrate; and transmitting the shear force according to the variable shear transmission property of the transparent flexible material to the flexible holographic optical element.

\* \* \* \* \*